(12) United States Patent  
Tang (10) Patent No.: US 7,029,126 B2
(45) Date of Patent: Apr. 18, 2006

(54) SINGLE PANEL COLOR IMAGE PROJECTION SYSTEM

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 0 days.

(21) Appl. No.: 11/056,321

(22) Filed: Feb. 10, 2005

(65) Prior Publication Data

US 2005/0157271 A1    Jul. 21, 2005

Related U.S. Application Data

(63) Continuation-in-part of application No. 10/758,496, filed on Jan. 15, 2004, now Pat. No. 6,893,133.

(51) Int. Cl.
- *G03B 21/28* (2006.01)
- *G03B 21/00* (2006.01)
- *H04N 9/12* (2006.01)
- *H04N 9/31* (2006.01)
- *H04N 5/74* (2006.01)

(52) U.S. Cl. ............ 353/81; 353/31; 353/121; 348/742; 348/759; 348/760; 348/771

(58) Field of Classification Search ........... 353/31, 353/33, 81, 121; 359/669, 831; 348/742, 348/759, 760, 771
See application file for complete search history.

*Primary Examiner*—Melissa Jan Koval
(74) *Attorney, Agent, or Firm*—Jonathan W. Hallman; MacPherson Kwok Chen & Held (57) ABSTRACT

In one embodiment, a color projection system includes a lamp; at least one prism configured to diffract light from the lamp into a diffracted beam; and an LC microdisplay panel or MEMS panel configured to receive the diffracted beam from the at least one prism, wherein by moving the at least one prism with respect to the light from the lamp, the diffracted beam received by the LC microdisplay or MEMS panel sequentially comprises a diffracted red beam, a diffracted blue beam, and a diffracted green beam, the LC microdisplay panel or MEMS panel being configured to sequentially modulate the diffracted red beam into a red sub-frame of an image, the diffracted green beam into a green sub-frame of the image, and the diffracted blue beam into a blue sub-frame of the image.

16 Claims, 8 Drawing Sheets

SINGLE PANEL COLOR IMAGE PROJECTION SYSTEM

RELATED APPLICATION

This application is a continuation-in-part of U.S. Ser. No. 10/758,496, filed Jan. 15, 2004 now U.S. Pat. No. 6,893,133.

TECHNICAL FIELD

This invention relates generally to color image projection systems, and more particularly to color image projection systems needing just a single liquid crystal (LC) microdisplay panel or a digital light processor (DLP) chip.

BACKGROUND

Color image projection systems that use liquid crystal (LC) microdisplay panels or DLP chips to modulate light projected onto a screen such as used in large-screen televisions face a number of technical challenges as well as manufacturing cost challenges. These challenges may be further explained with respect to a conventional LC-microdisplay-panel-based color image projection system. In such a system, there must be a light source that is then modulated by a light valve containing one or more LC microdisplay panel(s) or DLP chip(s) before the resulting modulated-light is projected onto a screen for viewing by a user. To achieve the desired viewable color image, three primary colors (typically red (R), green (G), and blue (B)) are separated from the white light provided by the light source. These primary colors are separately modulated by one or more light valves and then recombined or superimposed to form the image.

Because the image is formed from the separately-modulated beams of RGB colored light, there must be some means of separating these colors from the white light provided by the light source. These color separation means include dichroic mirrors, prism cubes, and color wheels. The light valve may contain three LC microdisplay panels: one to modulate the red light, one to modulate the green light, and one to modulate the blue light. Alternatively, the light valve may have just a single LC microdisplay panel that simultaneously modulates the RGB light using subpixels (one subpixel for each color being modulated), or in the case of DLP chip being used as the light valve, sequential RGB light derived from a spinning color wheel is modulated using MEMS based micro-mirrors. More recently, Philips has proposed a single LCOS (liquid crystal on silicon) microdisplay panel projection system using a scheme called "scrolling colors"—that is, after RGB color separation, three rotating prisms are employed to "scroll" RGB colors in field sequence respectively for the red, green and blue beams. The scrolling RGB beams are then realigned and modulated by a single microdisplay panel before projected onto the screen.

Regardless of whether the light valve contains one or three LC microdisplay panels or DLP chip, a number of problems arise in the design of such conventional color projection systems. For example, the use of three dichroic mirrors increases component cost and introduces the problem of realigning the separated RGB signals. Any misalignment will blur and/or introduce color shifts on the projected images. Alternatively, if color wheels are used to separate the RGB light, substantial power losses are introduced, inhibiting effective use of the light source. Moreover, should three separate LC microdisplay panels be used to individually modulate the separated RGB light beams, expensive and cumbersome alignment lenses are necessary to realign the separately-modulated light beams into a single RGB image, adding to the expense of providing three LC microdisplay panels. Furthermore, if just a single LC microdisplay panel containing RGB subpixels is used to simultaneously modulate the red, green, and blue light beams, expensive and cumbersome alignment lenses are still necessary to direct the beams exactly to the respective RGB subpixels. In addition, a single LC microdisplay panel with each pixel containing R,G, and B colored subpixels requires a complicated design and manufacturing process which reduces the overall product yield and increases cost. The more advanced Philips single LCOS panel design still has the problem of realigning the separated RGB beams and the associated complicated optics and increased cost.

Accordingly, there is a need in the art for improved color image projection systems having simplified optics allowing a more efficient use of the light source without the necessity of realigning and recombining separate RGB colored images.

SUMMARY

In accordance with an aspect of the invention, a color projection system is provided that includes a lamp; at least one prism configured to diffract light from the lamp into a diffracted beam; and an LC microdisplay panel configured to receive the diffracted beam from the at least one prism, wherein by moving the at least one prism with respect to the light from the lamp, the diffracted beam received by the LC microdisplay sequentially comprises a diffracted red beam, a diffracted blue beam, and a diffracted green beam, the LC microdisplay panel being configured to sequentially modulate the diffracted red beam into a red sub-frame of an image, the diffracted green beam into a green sub-frame of the image, and the diffracted blue beam into a blue sub-frame of the image.

In accordance with another aspect of the invention, a color projection system is provided that includes a lamp; at least one prism configured to diffract light from the lamp into a diffracted beam; and a digital light processor configured to receive the diffracted beam from the at least one prism, wherein by moving the at least one prism with respect to the light from the lamp, the diffracted beam received by the digital light processor sequentially comprises a diffracted red beam, a diffracted blue beam, and a diffracted green beam, the digital light processor being configured to sequentially modulate the diffracted red beam into a red sub-frame of an image, the diffracted green beam into a green sub-frame of the image, and the diffracted blue beam into a blue sub-frame of the image.

In accordance with another aspect of the invention, a method of color projection is provided that includes the acts of: providing a light beam incident on an at least one prism; moving the at least one prism with respect to the incident light beam, wherein the movement of the at least one prism is such that a diffracted light beam from the at least one prism sequentially comprises a diffracted red beam, a diffracted green beam, and a diffracted blue beam, and sequentially modulating the diffracted red beam from the at least one prism to form a red sub-frame of an image, sequentially modulating the diffracted green beam from the at least one prism to form a green sub-frame of the image, and sequentially modulating the diffracted blue beam from the at least one prism to form a blue sub-frame of the image.

BRIEF DESCRIPTION OF THE DRAWINGS

FIG. 8b is a side view of the arrangement of three diffraction gratings of FIG. 8a.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
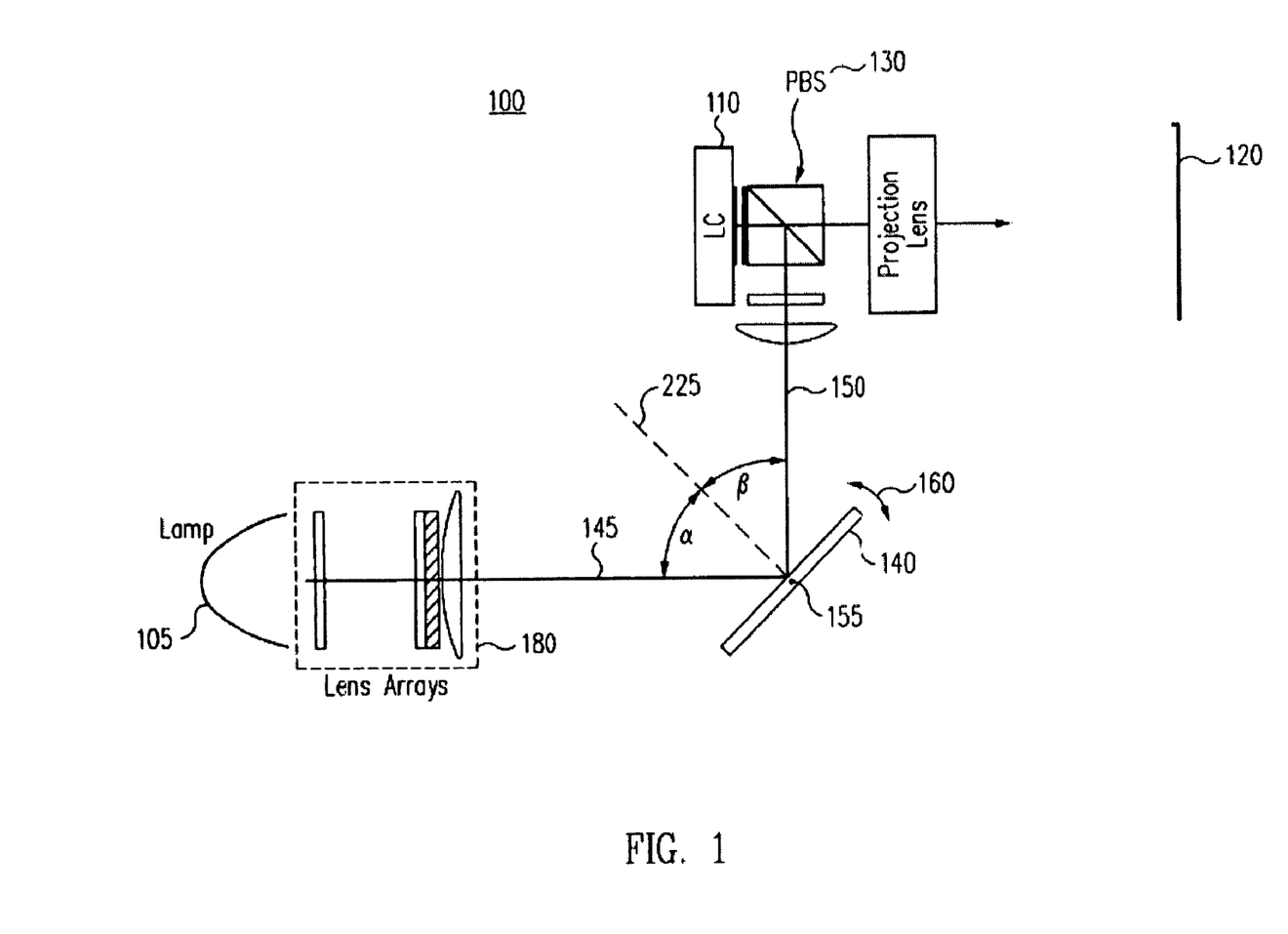
FIG. 1 is a diagram of a color image projection system using a single LC microdisplay panel and a reflection grating according to one embodiment of the invention.

FIG. 1 illustrates a color projection system 100 that improves the inherent losses typically experienced during separation of white light into red, green, and blue light beams. Lamp 105, which may be an ultra high pressure (UHP) lamp or other suitable lamp, provides a beam of white light. A single LC microdisplay panel 110 receives red, green, and blue light beams separated from the white light provided by lamp 105. LC microdisplay panel 110 modulates these beams as is known in the art so that pixels for an image projected onto screen 120 comprise the appropriate values of red, green, and blue light, thereby achieving the desired colors for each pixel. In the embodiment shown, LC microdisplay panel 110 combines with polarization beam splitter 130 in a reflective configuration. It will be appreciated, however, that a transmissive configuration for LC microdisplay panel 110 may also be used as is known in the art. Regardless of whether LC microdisplay panel 110 is configured in a reflective or transmissive configuration, LC microdisplay panel 110 may be in either an on or off axis as is also known in the art. In addition, LC microdisplay panel 110 may comprise a digital light processor, in which case, the polarization beam splitter can be eliminated (refer to FIG. 7B).

Figure 2A:
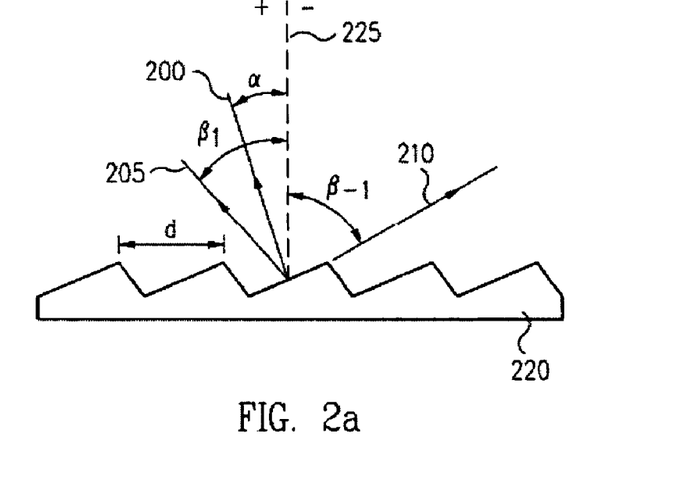
FIG. 2a illustrates the relationship between an incident light beam and the first order diffracted beams for a reflection grating.

A diffraction grating 140 may be used to diffract a white light beam 145 provided by lamp 105 into a diffracted beam. In the embodiment illustrated, diffraction grating 140 is a reflective grating. However, it will be appreciated that diffraction grating 140 could also be a transmission grating as will be explained further herein. The physics of diffraction gratings are well known. For example, consider FIG. 2a, which illustrates the relationship between an incident light beam 200 and a first order refracted beam 205 and also a negative first order refracted beam 210 for a reflective diffraction grating 220. The relationship between diffracted beams 205 and 210 and incident beam 200 is determined by the spacing "d" between grooves formed on the surface of diffraction grating 220. This relationship is given mathematically by:

$$m\lambda = d(\sin \alpha + \sin \beta) \quad \text{Equation 1}$$

where the angles $\alpha$ and $\beta$ are defined with respect to a normal 225 to the plane defined by diffraction grating 220, $\lambda$ is the wavelength of the incident light beam, and m is an integer value defining the diffraction order. Angles $\alpha$ and $\beta$ have a positive or negative value depending upon which side of normal 225 the resulting diffracted beam lies as shown by the positive and negative signs adjacent normal 225. To show the diffraction order of the refracted beam, the angle $\beta$ is given a subscript. From Equation 1 and FIG. 2a, it can be seen that given the angle $\alpha$ and the frequency of incident light beam 200, the angles $\beta_1$ and $\beta_{-1}$ are defined for the diffracted beams 205 and 210, respectively.

Figure 3:
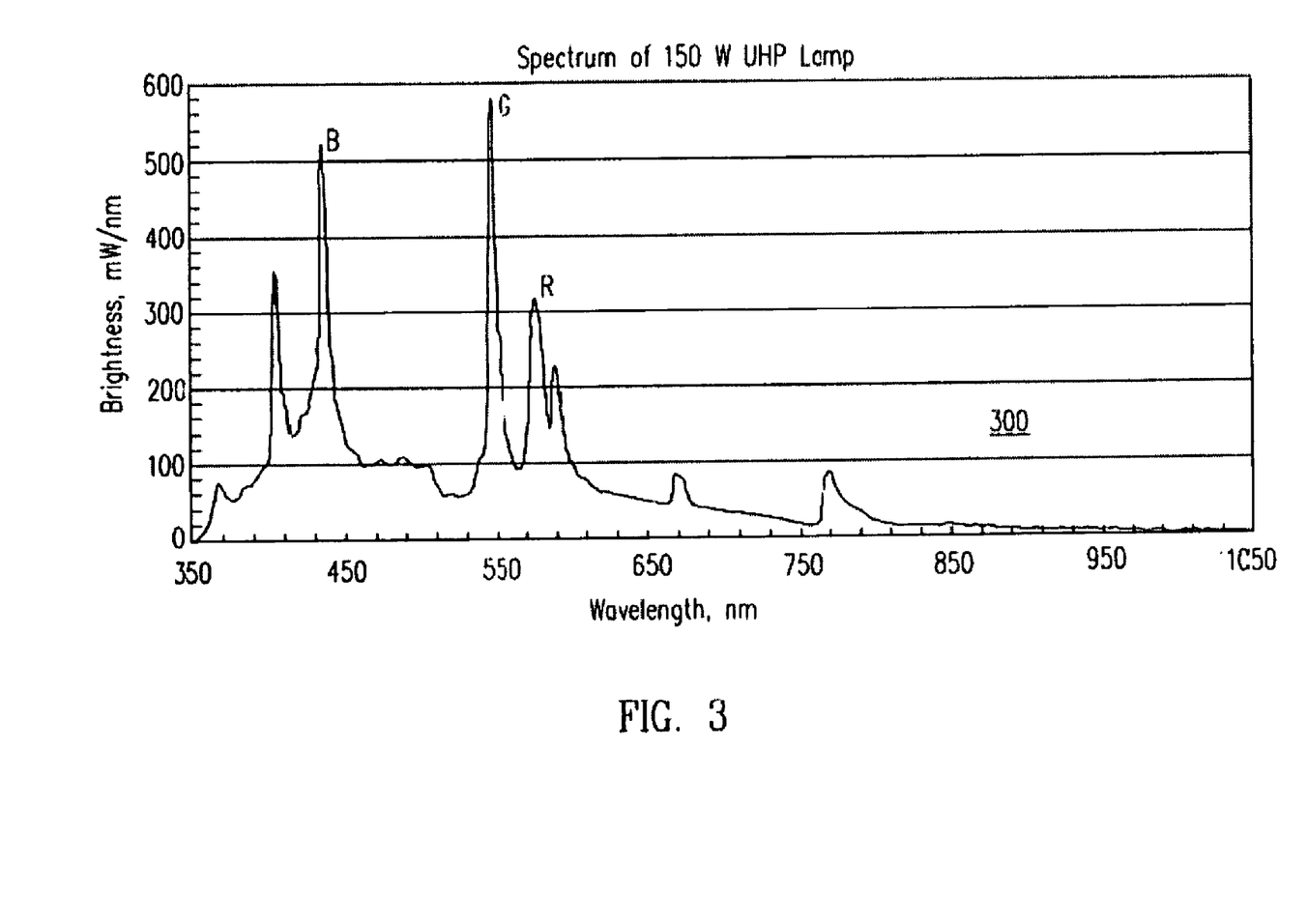
FIG. 3 illustrates the typical spectral power for an ultra high pressure lamp.

Referring back to FIG. 1, the angles $\alpha$ and $\beta$ are also shown. For generality, the diffraction order m for $\beta$ is not shown. In general, although any diffraction order could conceivably be used, a value of m=1 or m=−1 provides the greatest power in diffracted beam 150. Thus, it will be assumed that $\beta$ corresponds to either diffraction order in the following discussion. Light beam 145 incident on diffraction grating 140 is not a monochromatic beam such as incident beam 200 discussed with respect to FIG. 2a. Instead, white light beam 145 will typically have a spectrum 300 such as that shown in FIG. 3. Examination of spectrum 300 shows that the brightness power (in milliwatts per nanometer of wavelength) is concentrated in the blue, green, and red wavelengths and denoted by the B, G, and R letterings, respectively. The blue wavelength corresponds to approximately 450 nanometers in wavelength whereas the green wavelength corresponds to approximately 550 nanometers in wavelength. Finally, the red wavelength corresponds to approximately 690 nanometers in wavelength. It will be appreciated, of course, that the actual spectrum of lamp 105 may differ from spectrum 300. However, as known in the art, the actual spectrum will still be concentrated in the R, G, and B wavelengths. It follows that white light beam 145 from lamp 105 may be considered to primarily consist of the combination of R, G, and B beams. By rotating or rocking diffraction grating 140 about an axis at, for example, point 155, the appropriate values of $\alpha$ and $\beta$ are produced such that diffracted beam 150 comprises either an R, G, or B beam. For example, by rocking diffraction grating 140 through an angular range 160, diffracted beam 150 will sequentially comprise either an R, G, or B beam.

Figure 2B:
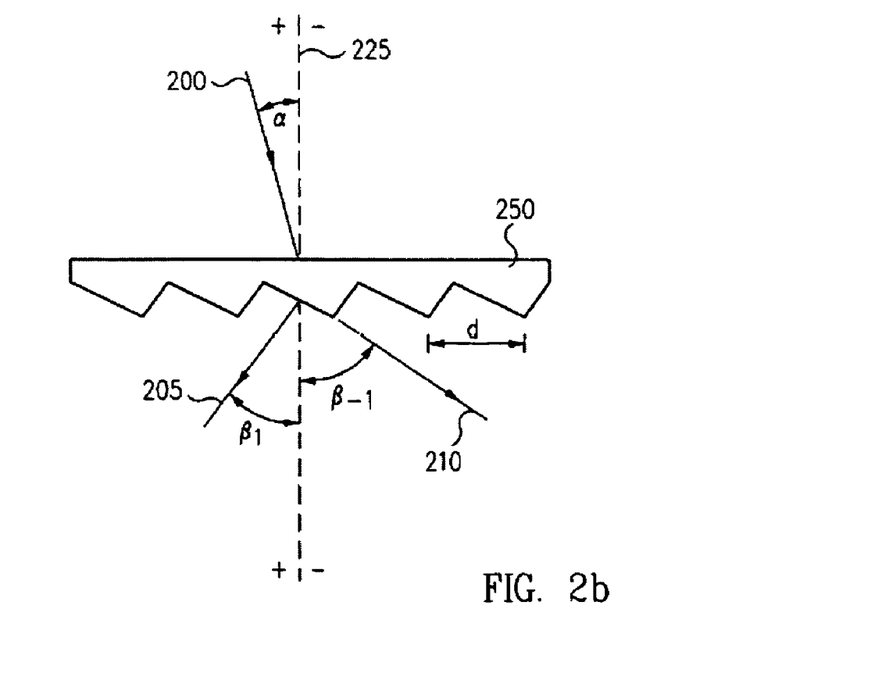
FIG. 2b illustrates the relationship between an incident light beam and the first order diffracted beams for a transmission grating

Advantageously, diffraction grating 140 introduces significantly less power loss into diffracted beam 150 than would be experienced if a dichroic mirror or a color wheel were used to split white light beam 145. In addition, no realignment means are required with respect to separated images of R, G, and B beams, making manufacture of color projection system 100 simpler, thereby achieving cost savings. Also, the use of a single LC microdisplay panel without the need for subpixels because of the sequential projection provides additional cost savings and manufacture simplification. Moreover, these significant advantages may also be achieved should diffraction grating 140 be a transmission grating such as grating 250 shown in FIG. 2b. Because grating 250 is a transmission grating, diffracted first order beams 205 and 210 project from the other side of grating 250 with respect to incident beam 200. Equation (1) still holds such that, in a color image projection system 400 shown in FIG. 4 that incorporates a diffraction grating 140 configured as a transmission grating, a diffracted beam 150 will still sequentially comprise either an R, G, or B beam.

LC microdisplay panel 110 may comprise any suitable LC microdisplay panel as is known in the art. However, in a projection television application, the sequencing of RGB images by LC microdisplay panel 110 should be faster than the response time of human eyes. For example, to achieve cinema-quality projected images, a frame rate of 24 frames per second is typically required. Each frame will consist of three sub-frames of RGB color (one red sub-frame, one green sub-frame, and one blue sub-frame), which corresponds to an average of about 14 milliseconds per color sub-frame at the 24 frames per second rate. Thus, LC microdisplay panel 110 should have a response time better than 14 milliseconds to match modern film frame rates without the need for software to perform interlacing or "pull-down" conversion. For example, consider the R, G, B color data used to drive LC microdisplay panel 110 as shown conceptually in FIG. 5 with respect to two consecutive video frames. The diffracted beam 150 is shown broken down into its sequential R, G, and B components. To keep diffracted beam 150 synchronous with incoming RGB data, diffraction grating 140 (FIGS. 1 and 4) may be rocked such that diffracted beam 150 would provide the R, G, and B components synchronous with the incoming data as shown. It will be appreciated, however, that the sequencing of diffracted beam 150 may be adjusted to suit a particular design and/or desired color adjustment. For example, consider again the spectrum 300 for an ultra high pressure lamp source shown in FIG. 3. Although the power is concentrated in the R, G, and B wavelengths, the intensities are not equal. Specifically, the power for the R wavelength is noticeably weaker than the power of the G and B wavelengths. In addition, the sensitivity of human eyes to different colors is also wavelength dependent. Thus, diffraction grating 140 could be rocked such that diffracted beam 150 comprises a R beam for longer periods than those periods in which diffracted beam 150 comprises a B or G beam. In other words, diffraction grating 140 would be moved such that it stays within the appropriate angular range to form diffracted beam 150 as an R beam longer than in the other angular ranges used to generate the B and G beams. The time-sequenced color control of LC microdisplay panel 110 may be controlled by an ASIC or DSP processor (not illustrated) as is known in the art. Such a conventional ASIC or DSP processor may be further modified to also control the movement of diffraction grating 140. Alternatively, a separate processor, state machine, or analog controller (not illustrated) could be used to control the movement of diffraction grating 140. It will be appreciated, however, that in a color slide or viewgraph projection application, the processing speed limitation of LC microdisplay panel 110 may be relaxed considerably.

Figure 4:
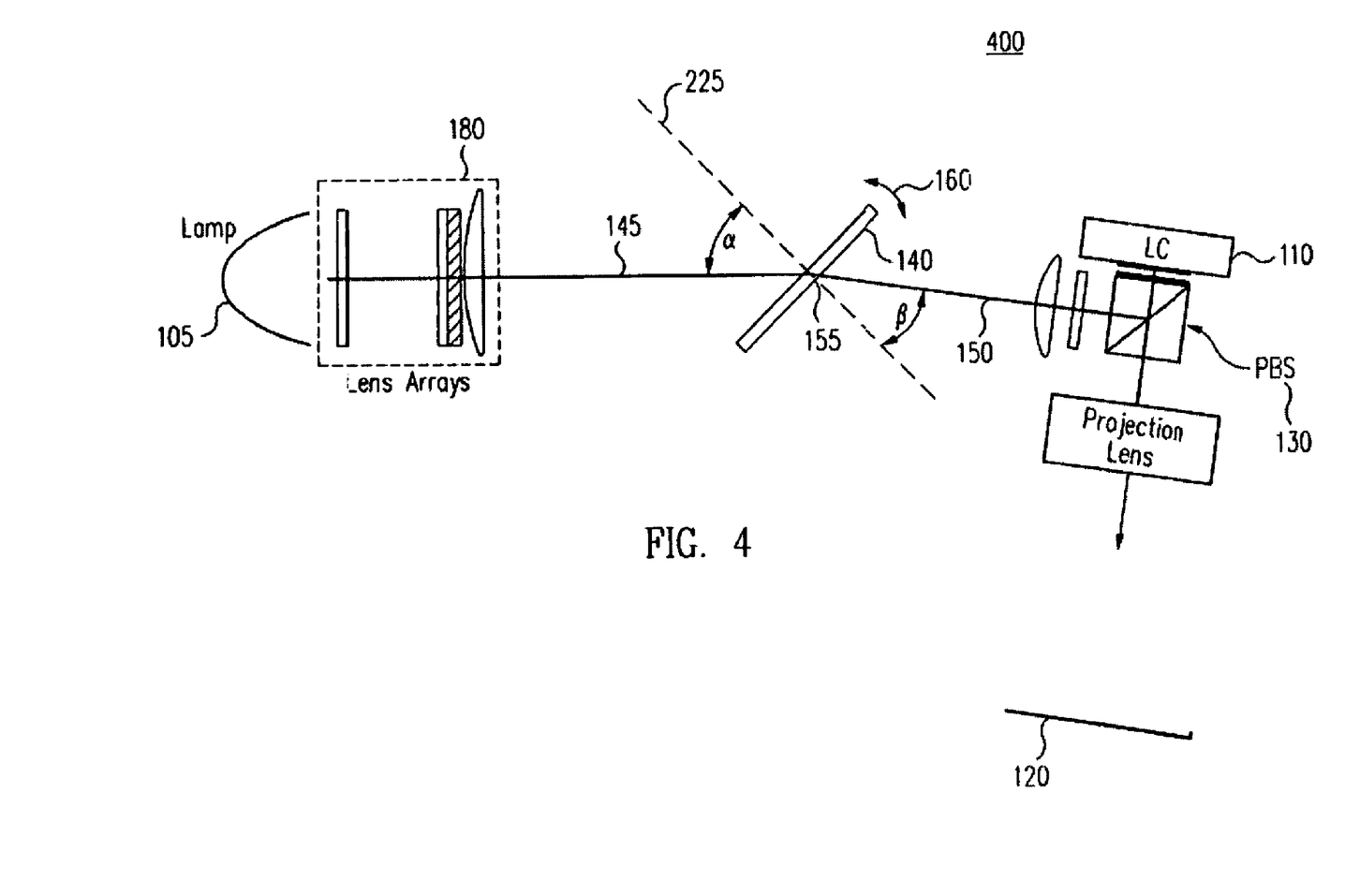
FIG. 4 is a diagram of a color image projection system using a single LC microdisplay panel and a transmission grating according to one embodiment of the invention.
Figure 5:
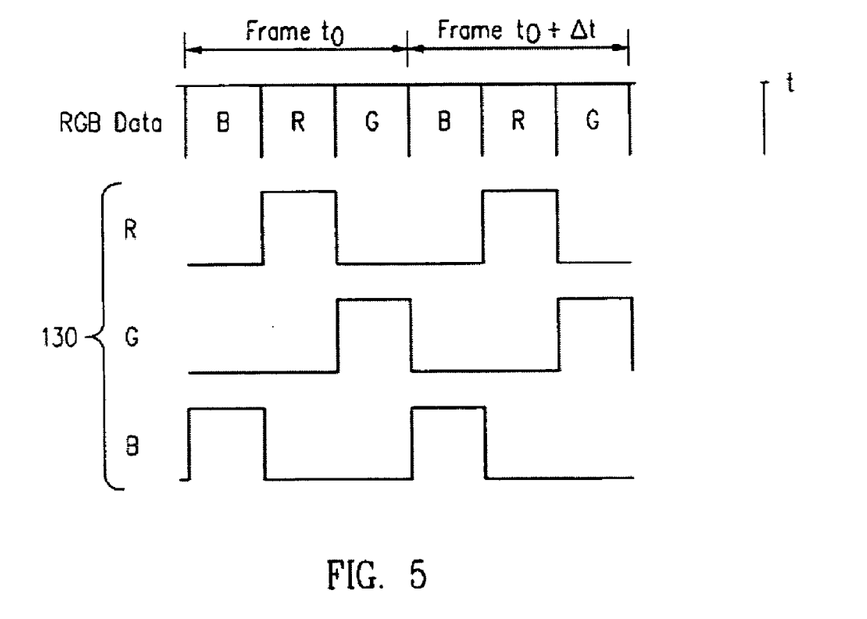
FIG. 5 illustrates a synchronous relationship between the driving image data for the single LC microdisplay panel of FIGS. 1 and 4 and the desired separated R, G, and B beams that are projected onto the single LC microdisplay panel.

Those of ordinary skill in the art will appreciate that color projection systems 100 and 400 are shown in simplified form in that numerous additional components such as other polarization filters are necessary to complete these systems. These additional components, however, are conventional and thus are not illustrated. To better provide a more uniform beam power across the width of diffracted beam 150, a lens assembly 180 for focusing white light beam 140 onto diffraction grating 140 may comprise a micro-lens array as described in co-pending application entitled "Microlens Arrays," U.S. Ser. No. 10/754,365, the contents of which are hereby incorporated by reference. Such a micro-lens array may provide more uniformly distributed light intensity across the whole field of the LC microdisplay panel 110 and thus improve the light intensity distribution or brightness of projected images.

Figure 6:
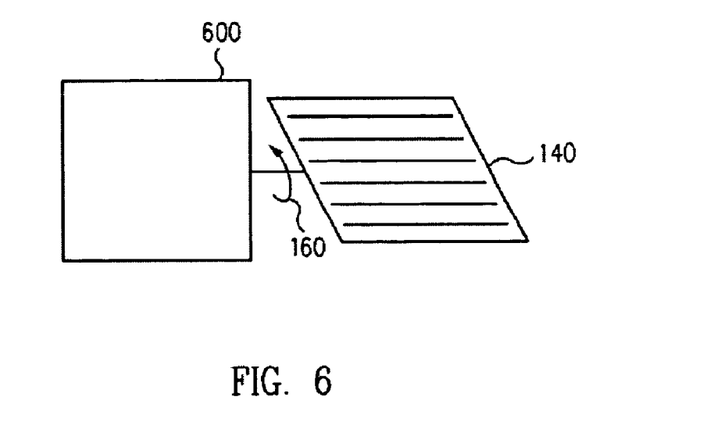
FIG. 6 illustrates a motor configured to rock the diffraction grating of FIGS. 1 and 4.

The movement of diffraction grating 140 may be accomplished using conventional electric motors such as motor 700 illustrated in FIG. 6. Typically, diffraction grating 140 need only be approximately ½ square inch in size and may be rocked through an angular range 160 of less than 10 degrees to achieve the appropriate sequential diffraction of R, G, and B beams. Thus, the demands on motor 700 are fairly minimal, allowing inexpensive designs for motor 700 to be used.

Figure 7A:
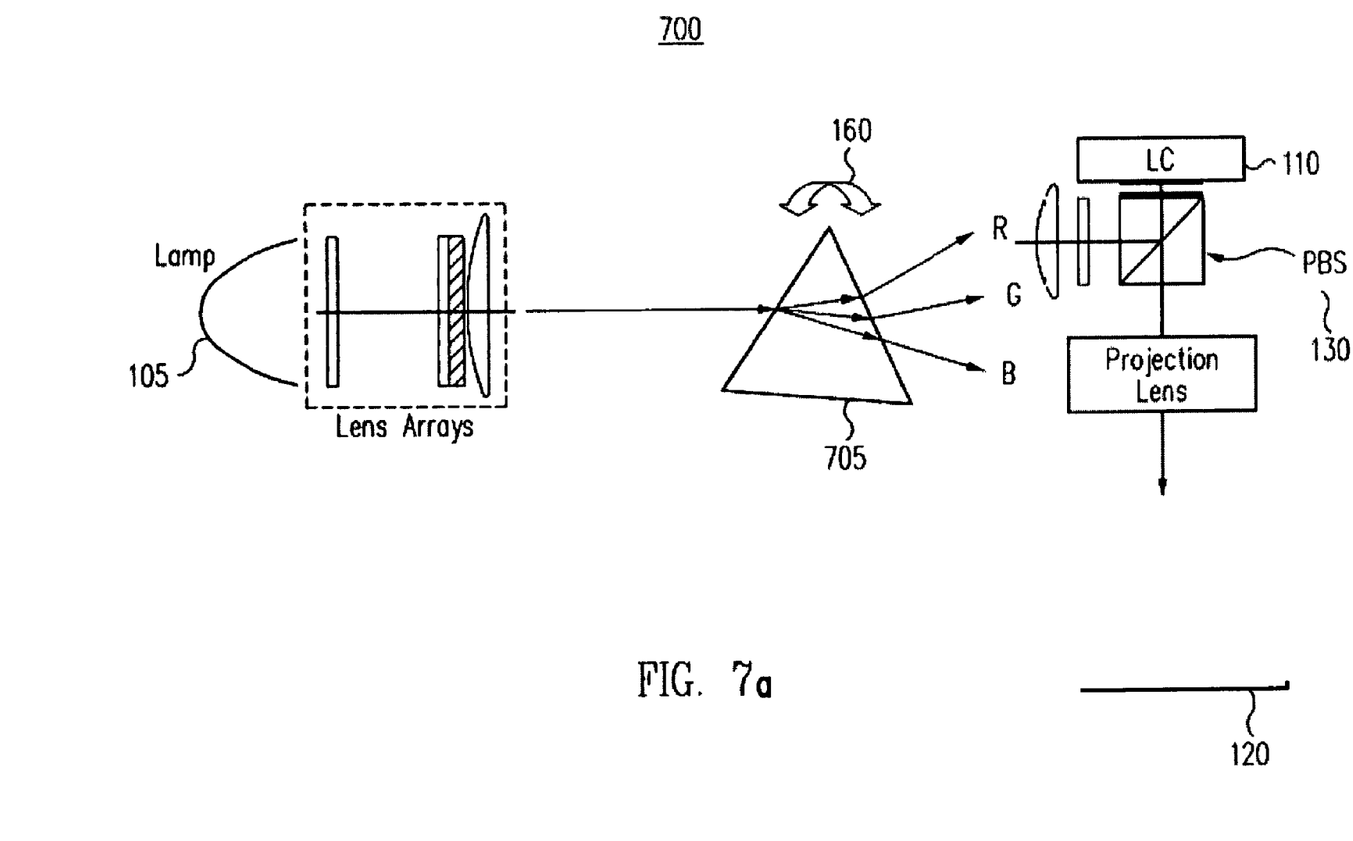
FIG. 7a is a diagram of a color image projection system using a single LC microdisplay panel and a dispersive prism according to one embodiment of the invention.
Figure 7B:
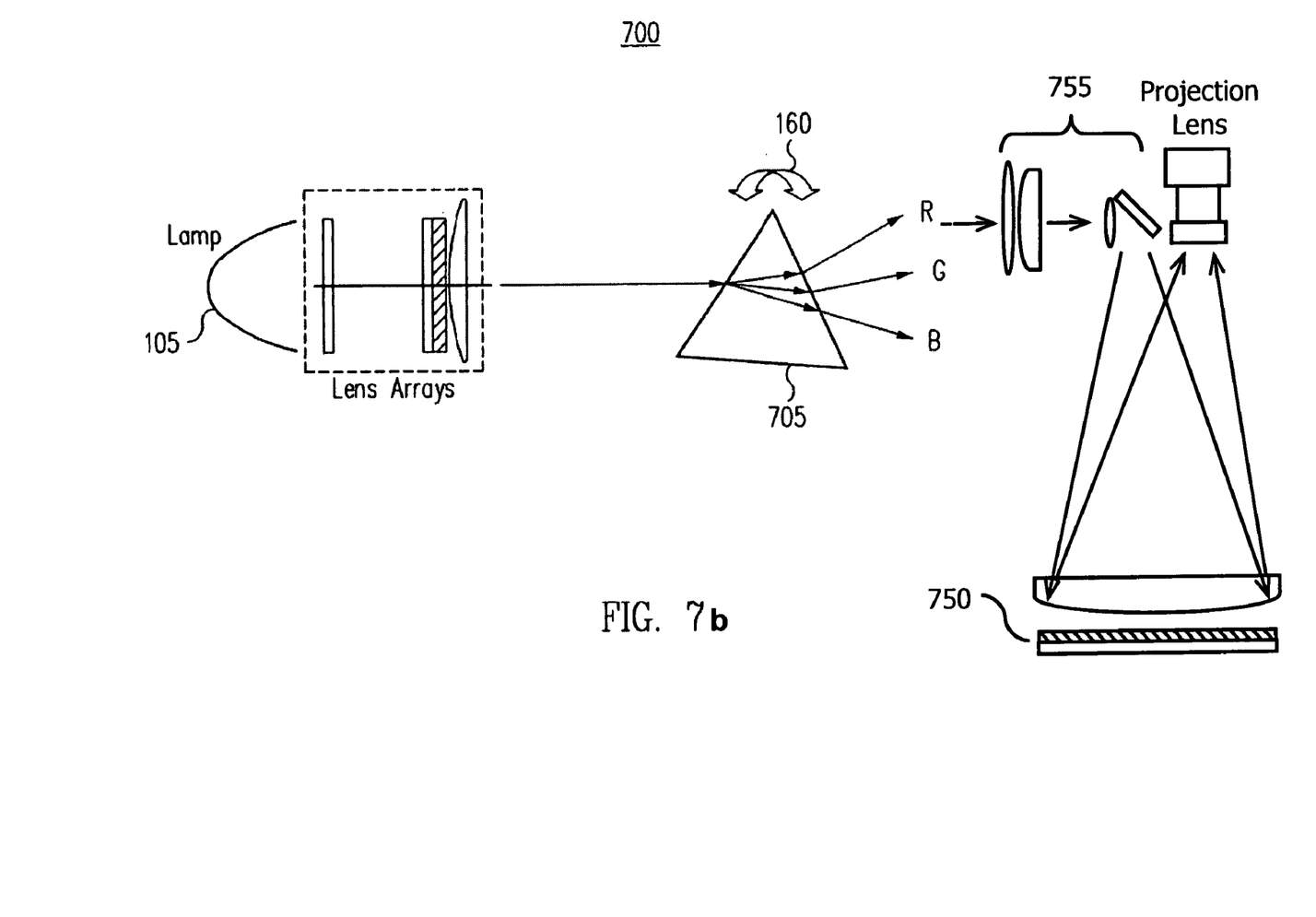
FIG. 7b is a diagram of a color image projection system using a MEMS-based DLP chip and a dispersive prism according to one embodiment of the invention.

Numerous modifications may be made to systems 100 and 400. For example, diffraction grating 140 may be replaced by a dispersive prism 705 as shown in FIG. 7 for a color image projection system 700. The remaining components may be arranged as discussed for FIGS. 1 and 4. As is known in the art, light refracted by prism 705 will refract differently depending upon wavelength. Thus, white light received from lamp 105 will be separated into R, G, and B beams. By rocking prism 700 through an angular range 160, these refracted beams may be received sequentially by LC microdisplay panel 110 so that appropriate modulation may be applied. Advantageously, prism 700 may be constructed from rugged material such as amorphous fused silica (synthetic quartz) that may be more resistant to oxidation than the materials used for diffraction grating 240. It will be appreciated that although prism 700 is configured as a transmissive prism, a reflective prism configuration may be used as well.

It will be appreciated that the color image projection system described herein may incorporate a MEMS panel such as used in a digital light processor (DLP) rather than an LCD panel. For example, turning now to FIG. 7b, a color projection system 750 includes a MEMS panel 750 such as used in a digital light processor (DLP) that receives light from prism 705 as processing by a condenser lens system 755. Through movement of prism 705, MEMS panel 750 may sequentially modulate the red, green, and blue sub-frames of an image projected through the projection lens. In an alternative embodiment, a reflective prism configuration could be used.

Figure 8A:
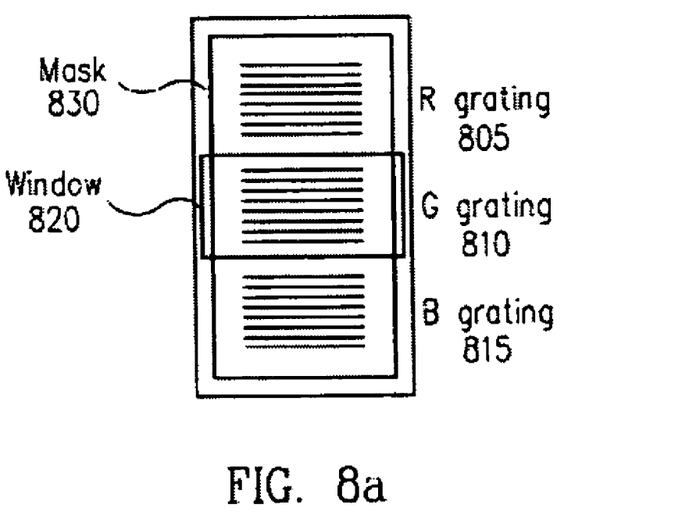
FIG. 8a is a top view of an arrangement of three diffraction gratings for separating RGB light according to one embodiment of the invention.
Figure 8B:
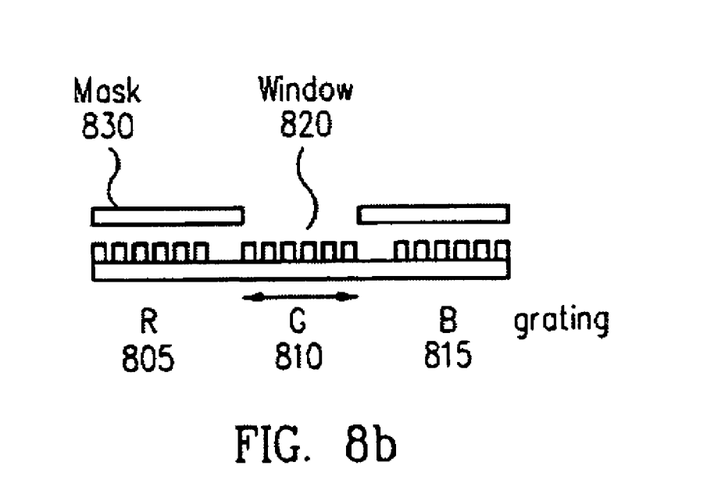

In yet another embodiment, the single diffraction grating 140 shown in FIGS. 1 and 4 may be replaced by three separate gratings: a grating 805 for red light, a grating 810 for green light, and a grating 815 for blue light as shown in top and side views in FIGS. 8a and 8b, respectively. Each grating would be configured to diffract light at the same angle. An LC microdisplay panel (not illustrated) may then be fixed to receive the diffracted light at this angle, whereby the LC microdisplay panel will sequentially receive R, G, and B diffracted light as gratings 805, 810, and 815 are laterally shifted with respect to a window 820 within a mask 830. Gratings 805, 810 and 815 may be constructed in either a reflective or transmission configuration as discussed with respect to FIGS. 1 and 4. A linear actuator (not illustrated) or other suitable motor may be used to laterally shift gratings 805, 810, and 815 at a desired rate with respect to window 820. By changing the lateral movement speed as gratings 805, 810, and 815 move with respect to window 820, a particular color may be directed for a longer period at the LC microdisplay panel. Alternatively, the relative widths of gratings 805, 810, and 815 may be altered to achieve the same effect. Moreover, a similar configuration may be constructed be replacing the gratings with prisms.

Accordingly, although the invention has been described with respect to particular embodiments, this description is only an example of the invention's application and should not be taken as a limitation. Consequently, the scope of the invention is set forth in the following claims.

I claim:

1. A color projection system, comprising:
   a lamp;
   at least one prism configured to diffract light from the lamp into a diffracted beam;
   an LC microdisplay panel configured to receive the diffracted beam from the at least one prism; and means for moving the at least one prism with respect to the light from the lamp, such that the diffracted beam received by the LC microdisplay sequentially comprises a diffracted red beam, a diffracted blue beam, and a diffracted green beam, the LC microdisplay panel being configured to sequentially modulate the diffracted red beam into a red sub-frame of an image, the diffracted green beam into a green sub-frame of the image, and the diffracted blue beam into a blue sub-frame of the image.

2. The color projection system of claim 1, wherein the means comprises a motor.

3. The color projection system of claim 2, wherein the motor is configured to move the at least one prism by rocking the at least one prism through an angular range.

4. The color projection system of claim 3, wherein the angular range is less than 10 degrees.

5. The color projection system of claim 1, wherein the at least one prism is a reflection prism.

6. The color projection system of claim 1, wherein the at least one prism is a transmission prism.

7. The color projection system of claim 1, wherein The LC miorodisplay panel is a reflective LC microdisplay panel.

8. The color projection system of claim 1, wherein the LC microdisplay panel is a transmissive LC microdisplay panel.

9. A color projection system, comprising:
   a lamp;
   at least one prism configured to diffract light from the lamp into a diffracted beam;
   a digital light processor (DLP) configured to receive the diffracted beam from the at least one prism; and means for moving the at least one prism with respect to the light from the lamp such that the diffracted beam received by the DLP sequentially comprises a diffracted red beam, a diffracted blue beam, and a diffracted green beam, the DLP being configured to sequentially modulate the diffracted red beam into a red sub-frame of an image, the diffracted green beam into a green sub-frame of the image, and the diffracted blue beam into a blue sub-frame of the image.

10. The color projection system of claim 9, wherein the means comprises a motor.

11. The color projection system of claim 10, wherein the motor is configured to move the at least one prism by rocking the at least one prism through an angular range.

12. The color projection system of claim 11, wherein the angular range is less than 10 degrees.

13. The color projection system of claim 9, wherein the at least one prism is a reflection prism.

14. The color projection system of claim 9, wherein the at least one prism is a transmission prism.

15. A method of color projection comprising:
   providing a light beam incident on an at least one prism;
   moving the at least one prism with respect to the incident light beam, wherein the movement of the at least one prism is such that a diffracted light beam from the at least one prism sequentially comprises a diffracted red beam, a diffracted green beam, and a diffracted blue beam;
   sequentially modulating the diffracted red beam from the at least one prism to form a red sub-frame of an image;
   sequentially modulating the diffracted green beam from the at least one prism to form a green sub-frame of the image; and
   sequentially modulating the diffracted blue beam from the at least one prism to form a blue sub-frame of the image.

16. The method of claim 15, wherein moving the at least one prism comprises rocking the at least one prism through an angular range.

* * * * *